United States Patent [19]

Christensen et al.

[11] 4,271,468

[45] Jun. 2, 1981

[54] MULTIPROCESSOR MECHANISM FOR HANDLING CHANNEL INTERRUPTS

[75] Inventors: Neal T. Christensen, Wappingers Falls; William C. Van Loo, Poughkeepsie; Robert H. Werner, Wappingers Falls; Joseph A. Wetzel, New Paltz; Carl Zeitler, Jr., Poughkeepsie, all of N.Y.

[73] Assignee: International Business Machines Corp., Armonk, N.Y.

[21] Appl. No.: 91,902

[22] Filed: Nov. 6, 1979

[51] Int. Cl.³ .................................. G06F 15/00
[52] U.S. Cl. ........................................... 364/200
[58] Field of Search .................... 364/200 MS File

[56] References Cited

U.S. PATENT DOCUMENTS

| | | | |
|---|---|---|---|
| 3,421,150 | 1/1969 | Quosig et al. | 364/200 |
| 3,444,525 | 5/1969 | Barlow et al. | 364/200 |
| 3,593,300 | 7/1971 | Driscoll, Jr. et al. | 364/200 |
| 3,810,105 | 5/1974 | England | 364/200 |
| 4,001,783 | 1/1977 | Monahan et al. | 364/200 |
| 4,015,243 | 3/1977 | Kurpanek et al. | 364/200 |
| 4,091,455 | 5/1978 | Woods et al. | 364/200 |

*Primary Examiner*—Harvey E. Springborn
*Attorney, Agent, or Firm*—Bernard M. Goldman

[57] ABSTRACT

The disclosure relates to multiprocessor handling of plural queues of pending I/O interrupt requests (I/O IRs) in a main storage (MS) shared by plural central processors (CPs). An input/output processor (IOP) inserts I/O IR entries onto the queues in accordance with the type of interrupt. The entries in the queues are only removed by the CPs, after their selection by a system controller (SC) for execution of an interruption handling program.

An I/O interrupt pending register in I/O interrupt controller circuits in the SC is used in selecting CPs to handle the I/O IRs on the queues. The bit positions in the pending register are respectively assigned to the I/O IR queues in MS, and the order of the bit positions determines the priority among the queues for CP handling. An I/O IR command from the IOP to the SC sets a corresponding queue bit position in the pending register and controls the addition of an entry on the corresponding queue in MS. If a bit is set to one, the corresponding queue is non-empty; if set to zero, the queue is empty.

A broadcast bus connects the outputs of the bit positions of the pending register to each of the CPs.

In each CP, acceptance determining circuits connect to the broadcast bus and accept the highest-priority-unmask non-empty-state bit position being broadcast. From this, the CP sends the SC an accepted queue identifier signal and an accept signal when the CP is in an interruptable state. The CP also sends to the SC a wait state signal if the CP is then in wait state.

Selection determining circuits in the SC receive the accept, wait (if any), and queue identifier signals from all accepting CPs and select one accepting CP per accepted queue at any one time. The selection circuits can perform the selection of plural CPs in parallel, and send a select signal to each selected CP.

An inhibit register in the interrupt controller in the SC inhibits selected bits on the broadcast bus to all CPs except the selected CP for the selected queue identifier. The inhibit on any bit is removed when the selected CP ends its acceptance of the corresponding queue, so that any CP can select the next entry on the corresponding queue.

When any selected CP finds it has emptied a queue, it activates a reset line to the SC which resets the corresponding bit in the pending register to indicate the empty state.

26 Claims, 6 Drawing Figures

MULTIPROCESSOR MECHANISM FOR HANDLING CHANNEL INTERRUPTS

INTRODUCTION

This invention relates to control means in a multiprocessing system for receiving plural levels of interrupts from shared input-output (I/O) devices connected to the data processing system for controlling the selection of one of plural processors to handle each I/O interrupt, wherein the selected processor need not be the processor which initiated the input-output operation causing the interrupt.

BACKGROUND AND PRIOR ART

The prior IBM System/360 Model 67-2 multiprocessor system can select any of its plural processors to handle an I/O interrupt, and the I/O device sending the interrupt signal need not have been started by the processor selected to handle its I/O interrupt signal.

The System/360 M67-2 multiprocessing system could contain from two to four CPU's and one or two 2946 channel controller units (CCU); each CCU is connected to up to seven I/O channels. Each CCU controls the I/O selection of its connected channels by any CPU issuing a Start I/O (SIO) instruction. The CCU receives each I/O interrupt from its channels, and the CCU selects any available CPU for handling each received I/O interrupt. The CPU selected to handle an I/O interrupt may be different from the CPU which issued the SIO. This is described in the IBM Manual having Form No. Y27-2118-0 which was published in 1967.

In the System/360 M67-2 MP, any I/O interrupted channel sent a channel interrupt (CI) signal to the CCU. The CI signal was received by the "Interrupt Masking and Interrupt Priority Logic" in the CCU. When one or more channel interrupt signals was received by the CCU, the CI's were filtered by a mask gate matrix, one mask gate for each channel per CPU. The mask gates are enabled/disabled by mask bits in a control register 4 in each CPU. The CI signals to enabled mask gates are passed to a respective priority circuit for each CPU to permit the simultaneous selection of one CI per CPU. The priority sequence is channels 1–6, 0. When each priority circuit outputs a CI request, it is sent to the respective CPU connected to the priority circuit output. The same CI is normally broadcast to all CPU's. Since up to four CPU's could be configured in a M67-2 MP, a CI request would be broadcast to all (up to four) CPU's simultaneously.

Each M67-2 MP CPU in an interruptable condition normally responds to a CI request with an "Interrupt Response CPUX" signal back to the requesting CCU indicating that the responding CPU can handle the interrupt. (A CPU is interruptable when it is in a wait state or has reached an interruptable point during execution.) The CCU then selected one of the responding CPU's to handle the interrupt. The CCU made the CPU selection by means of its CPU On-line priority logic which gives priority among plural responding CPU's to the lowest numbered CPU, i.e., CPU1 has highest priority and CPU$\propto$ has lowest priority. The On-line priority logic outputs the identifier (ID) of the selected CPU.

The CCU then sends the selected CPU interrupt response signal and the selected CPU ID signal to interrupt response controls in the CCU. They respond by sending to the selected CPU the channel address of the interrupting channel and the unit address of the interrupting device received from the channel. The selected CPU can then take the interrupt by posting the received channel and device addresses, and other received information, into its channel status word (CSW) in main storage and swapping program status words (PSWs).

If all channels are masked on, only one CI request can be made by a CCU to all CPU's simultaneously. If the channel masks are applied differently by the different CPU's, different CI requests could be made, e.g. a different CI request to each CPU, and each such CPU could simultaneously send an interrupt response signal to the CCU.

However, in the latter case, only one of simultaneous CPU response signals could be selected by the CCU, because the On-line CPU Priority Logic would select only one CPU at any one time. Each other CPU channel interrupt response remained pending while the CCU selected them, one at a time, in accordance with the On-line CPU priority logic.

When the On-line logic selects a CPU, the unselected CPUs are not released for handling another CI until the selected CPU is released when it has received the CSW information. Then all CPU responses then existing contend for priority in the CCU, which then determines which CPU will next handle a CI. Hence, no overlap in CSW generation is obtainable among the CPUs. Thus, the system is arranged for the CCU to control plural simultaneous CIs to be serially handled by the plural CPU's.

After taking the interrupt by storing the CSW and OLD PSW and by accessing the NEW I/O PSW, the interrupted CPU executes the operating system CI handling program. The software may control an interrupted processor to take one or more other interrupts and enqueue them before completing the handling of an interrupt, i.e., nesting the interrupt handling.

In a U.S. Pat. No. 3,421,150 to Quosig et. al. IR's (I/O Interrupt Requests) are queued onto a plurality of lists in main storage. Each IR is put on a list in Main Storage independently of processor selection for handling the IR. Quosig associates the IR lists with different I/O controllers. Quosig sequentially polls his processors in a predetermined priority sequence for determining their interruptability states and selects the first sensed interruptable processor to handle a priority selected IR. Quosig selects the processor in the most interruptable state during the sequential scan.

An article published in the Dec. 1966 Proceedings of the IEEE on pages 1812 to 1819 by R. J. Gountanis and N. L. Viss is similar in subject matter to the disclosure in U.S. Pat. No. 3,421,150.

In a U.S. Pat. No. 4,015,243 to Kurpanek et. al. the queuing of each IR is dependent on prior selection of a processor to handle the IR. To sense processor interrupt states, Kurpanek goes to his processors, while Quosig senses processor line signals sent to his multiprocessor interrupt directory hardware.

On the other hand, the M67-2 MP broadcasts one priority selected IR to all processors in the system. In the M67MP, the processors each determine their acceptance of a broadcast IR, and then the CCU selects an accepting processor and signals the selection to the selected processor. The M67MP processor acceptance signal is "CPU-X Response" to the CCU.

Kurpanek and Quosig have the interrupt control unit select a candidate processor, and then have that processor (rather than the interrupt control unit) determine the acceptance or rejection of the candidate selection.

SUMMARY OF THE INVENTION

The subject invention provides an improved system allowing simultaneous control of a plurality of central processors (CPs) for selecting the CPs to process pending channel interrupts (CIs) on a plurality of CI queues in main storage. A channel processor receives interrupt signals from a plurality of I/O control units, I/O devices, their subchannels and the channel. For each pending interrupt signal it receives, the channel processor posts an interrupt request (IR) entry to one of the queues it selects in accordance with a preassignment of queues to the source and type of interrupt. The channel processor only puts entries on the CI queues but does not process or remove entries from the queues. Queue entries are only removed and processed by selected central processors (CPs) in the multiprocessor system. The CI queues are assigned different priorities in accordance with the speed required for processing the interrupts pending on them. On any single queue, the entries are processed on a first-in, first-out basis by the selected CP, which need not be the CP which issued the start I/O signal resulting in in the interrupt.

This invention provides channel interrupt (CI) controller circuits within a system controller (SC) in an MP to determine which CP will be selected to remove and process each pending CI queue entry. Upon the occurrence of an I/O type of interrupt, the channel processor sends an interrupt command to the CI controller indicating which CI queue is to receive an entry for that pending interrupt. As part of this operation, the channel processor posts an IR entry on the selected queue in main storage.

An interrupt queue pending (PND) register is provided in the CI controller which has register positions respectively assigned to the different CI queues in their priority sequence. The set/reset state of the corresponding positions in the pending register indicate the non-empty/empty condition of the respective CI queues in main storage. Each time the channel processor sends an interrupt command, the CI controller sets the corresponding queue position in the pending register to indicate a non-empty state for that queue.

The states of all positions of the interrupt queue pending register are broadcast to all CPs in parallel for all queues not having a currently selected CP.

Whenever any CP is in an interruptable state, it accepts the highest priority unmasked queue signal being broadcast by providing a queue identifier signal and an accept signal to the CI controller in the SC. A CP is in an interruptable state if it is in enabled wait state or has reached an interruptable point in its execution. The accepting CP also sends a wait signal to the CI controller if the CP is then in an enabled wait state.

CPs simultaneously accepting different queues are not in conflict and are simultaneously selected by the CI controller sending them select signals. The CI controller has a separate select line to each CP on which the controller signals its CP selection. Thus, simultaneous selections can be made for plural queues even though one or more of the queues has plural accepting CPs.

The CI controller selects among accepting CPs for the same queue by giving priority to any accepting CP in wait state. If more than one CP is in wait state, a preassigned priority by CP number is used to select one of the CPs in wait state. If no CP is in wait state, then the preassigned priority is used to select an accepting CP for that queue.

Any accepting but non-selected CP immediately senses its non-selection and releases its acceptance. It then accepts any highest priority pending queue. If no pending queue exists, the processor returns to its interrupted operations.

Upon selection of a CP to process a pending interrupt on an identified queue, the CI controller inhibits the broadcast to other CPs of the non-empty state of the selected queue. Then a second CP cannot accept a queue while it is being processed by a first CP. The states of the non-selected non-empty queues will continue to be broadcast to all CPs so that another queue may at any time be selected by another CP.

When a selected CP completes its processing of one entry in the accepted queue, the CP turns off its accept signal to the CI controller, which then turns off the select signal to that CP. Also, the inhibit signal is removed on the broadcast of the corresponding queue position of the pending register, so that queue position resumes being broadcast to all CPs if that queue is then non-empty. Then all processors may contend for the next entry on the queue. No contention advantage is provided to the processor which handled the last entry in the same queue, and each entry is selected according to the then current conditions existing among the CPs.

When a selected CP removes an entry from the queue, the CP updates a queue field in main storage that indicates the number of remaining entries in that queue. If the CP finds there are no further entries in that queue, the CP sends a reset signal on a special line to the CI controller as the CP turns off its accept signal. The reset signal causes the CI controller to reset the corresponding queue position in the pending register in order to broadcast that there are no other pending interrupt entries remaining in that queue at that time.

After the CP turns off its accept signal, the CP handles its removed entry by interrupting its operation by changing program status words (PSWs) in the conventional manner. The CP then executes an interrupt handling program, after which the CP can accept another I/O interrupt request if any is pending. If no interrupt request exists, the CP returns to normal operation.

Therefore the objects of this invention provide for:

1. Parallel signalling of plural I/O interrupt pending signals by a CI controller to plural CPs, which may concurrently process plural I/O interrupts in parallel while new I/O interrupts are being signalled to the CI controller.
2. An I/O interrupt controller register having a position for each of plural channel interrupt (CI) queues in main storage for interfacing the empty/non-empty states of the respective queues to all central processors (CPs).
3. Simultaneously broadcasting to plural CPs, the empty/non-empty states of the plural CI queues in main storage. A non-empty queue has one or more entries representing a pending interrupt from an I/O device, device controller, subchannel, or channel.
4. The simultaneous acceptance by plural CPs for handling the same or different interrupt queues.
5. Accept signal lines from each CP to the CI controller to signal the controller of acceptance of an I/O interrupt request by a CP in an interruptable state.
6. A CP wait line being provided from each CP to the CI controller to signal the controller that the acceptance of an I/O pending interrupt is by a CP in wait state.

7. The CI controller giving selection priority to a CP sending a wait-state acceptance over a CP sending a non-wait-state acceptance, whenever plural CPs simultaneously accept the same queue.
8. The CI controller giving selection priority to a highest priority CP of plural CPs simultaneously sending only wait-state acceptances or only non-wait-state acceptances.
9. CP select lines from the CI controller in parallel to all CPs to enable simultaneous CP selections by the controller.
10. CP termination of its accept signal after any selected CP has finished removing a pending interrupt entry from its selected queue.
11. Inhibit registers in the CI controller for inhibiting the broadcast of a selected non-empty queue signal to each non-selected CP. The inhibit condition for any queue signal is removed by the CI controller when the selected CP terminates transmission of its accept signal to indicate the removal of a pending interrupt request entry from the queue.
12. CP issuance of a reset signal after the selected CP removes the last entry in the selected queue to make the queue emtpy.
13. Any CP being capable of accepting the next entry on a queue upon the completion of handling the prior entry on that queue by any CP.
14. Stopping the broadcast of a queue signal to all CPs when a reset signal is provided from any CP handling a last entry on the queue.

These and other objects, features and advantages of the invention may be more fully understood and appreciated by considering the following detailed description in association with the accompanying drawings.

GENERAL DESCRIPTION

Figure 1:
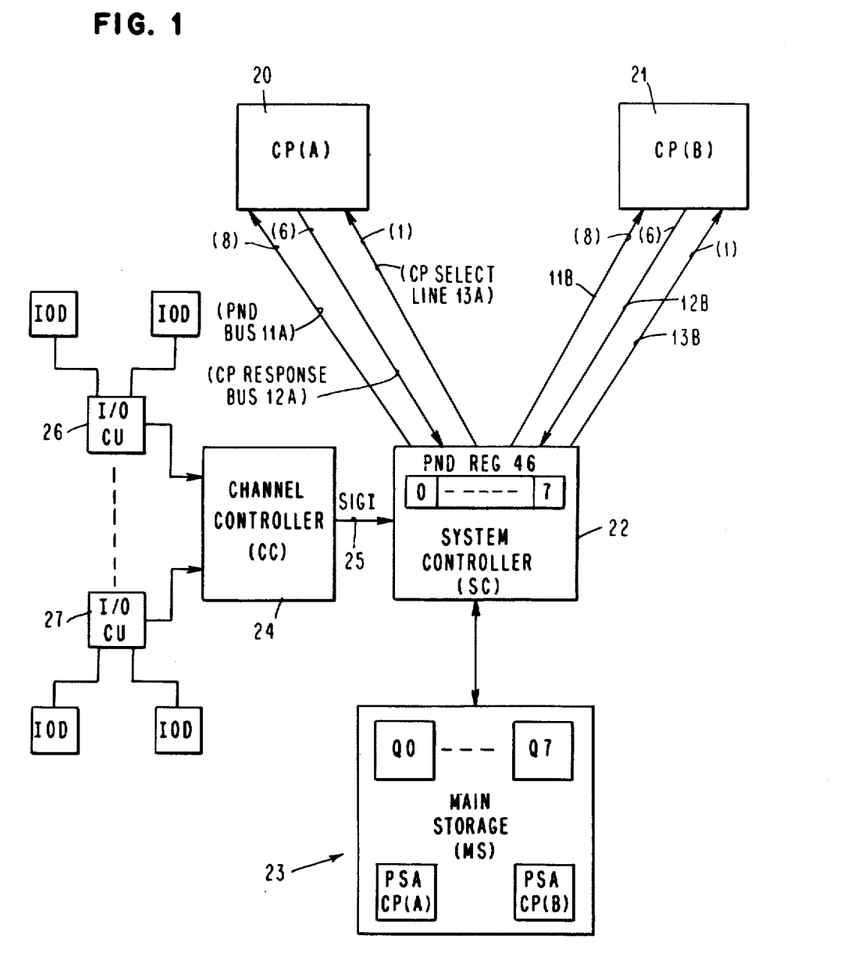
FIG. 1 is a representation of a multiprocessing system containing the invention in its system controller (SC) and central processor (CP) components and their interconnection.

FIG. 1 shows a multiprocessor system having two central processors 20 and 21 identified as CP(A) and CP(B), which are connected to a system controller (SC) 22. A channel controller (CC) 24 and main storage (MS) 23 also connect to SC22. A channel controller (CC) 24 and main storage 23 also connect to SC22. A plurality of I/O control units (CUs) 26 through 27 are connected to CC24, and one or more I/O devices (IOD) are connected to each control unit. Any I/O device may be started by an instruction executed by either CP(A) or CP(B). Any I/O device, its control unit, its sub-channel or channel may generate interrupt signals in the conventional and well known manner. These I/O type of interrupt signals are sent to channel controller 24 which generates an interrupt command, signal interrupt (SIGI), which communicates each I/O interrupt to SC22 on a connecting bus 25. The SIGI command has bits which identify the queue in MS23 on which an entry will be posted for this interrupt. The SIGI command is generated within CC24 by a processor that executes a microprogram that generates the SIGI signals which are transferred to SC22, and controls the posting of an entry on one of eight queues, Q0 through Q7, in MS23. CC24 enters each new entry at the bottom of the selected queue, and a count field with the queue is updated to indicate the number of active interrupt entries currently in the queue. The entries in each queue are address chained in the conventional manner. The active entries in each queue represent pending interrupt requests which await handling by either one of the CP(A) 20 or CP(B) 21. As soon as each entry is placed on a queue by CC24, the interrupt signal may be cleared at its source.

Generally, the device causing a queue entry cannot proceed with its next operation until the entry is handled by a selected CP, which will execute a system control program to determine the next operation of the I/O device, CU, subchannel or channel when handling the entry.

In SC22, the existence of each I/O interrupt queue in MS23 is indicated by a respective position within a pending (PND) register 46. Register 46 has eight bit positions 0–7 which correspond to the eight queues Q0–Q7 in MS23. Each entry is made on one of queues 0–7 in main storage 23 under control of a microprogram executed in CC24. Each time CC24 makes an entry, it sends a SIGI command to SC22, and the decoded command sets a corresponding bit in PND register 46 to identify the queue on which an entry is to be added.

Each SIGI command sets its queue respective PND bit in register 46 even though that bit may already be in a set state due to a prior SIGI signal for the same queue, in which case the current SIGI signal only continues the set state of that PND register bit position.

The SIGI signals from CC24 can only set corresponding bits in the PND register 46. CC24 cannot reset any bits in register 46. PND register bits can only be reset by CP20 or CP21, when it has handled the last entry on the corresponding queue and thereby emptied the queue. Therefore, the set state of a PND register bit indicates that its queue is non-empty, i.e. contains one or more active entries representing pending I/O interrupts. A reset state for any PND bit indicates its corresponding queue is empty, i.e. does not contain any pending interrupt entry.

The order of the bit positions 0–7 in PND register 46 represents the respective queues 0–7. The queues are given a priority relative to their numerical sequence with queue 0 having the highest priority and queue 7 having the lowest priority.

Any broadcast bit PND(O)–(PND(7) may be masked off by a CP with the conventional I/O mask bits in a control register 51 in the CP. Any PND bit which is masked off is not available for acceptance.

The eight bit positions in PND register 46 are broadcast as states PND(0) through PND(7) to all CPs, 20 and 21, on PND broadcast busses 11A and 11B. Each CP looks at the received state PND(0)–PND(7) on bus 11A or 11B, respectively, when the CP is in an interruptable state, during which the CP may accept the highest-priority non-empty queue that is allowed for that CP by its I/O mask in register 51 in FIG. 3A. Whenever a CP accepts a non-empty queue, it signals its acceptance to SC22 and simultaneously sends the queue identifier (QID) of the accepted queue. Each PND bit position broadcasting a zero state is ignored by each CP, because the zero state indicates the corresponding queue is empty. Each PND bit position disabled by a CP I/O mask is likewise ignored.

A CP is interruptable if it is in enabled wait state or reaches an interruptable point in its execution.

Response busses 12A and 12B are provided from each CP20 and 21 to SC22. Each response bus 12 contains six lines which include an accept line, three lines to signal an accept QID, a wait line to signal whether or not the CP is in wait state during the acceptance, and a reset line. If the CP is in enabled wait state at the time of its acceptance of a non-empty queue, the CP signals the SC on its response bus 12 that it is in wait state at the same time it signals its acceptance and the QID. If the CP is not in wait state when it accepts an interrupt request, it only signals on the accept line and the QID lines in its bus 12. The acceptance signal and QID remain activated from the time the CP indicates its acceptance until the CP is done operating on the queue, which is when the CP has removed the oldest active entry on the queue. Then, the CP immediately takes the interrupt required by the removed entry, after all signalling between the CP and SC is completed in regard to that entry. The wait signal, if any, is active for one machine cycle which is during the first cycle for the accept signal.

A CP may not handle a queue merely because the CP has accepted that queue. SC22 selectes which CP will handle a queue at any given time by activating a select line 13A or 13 B to the selected CP. SC selection of CPs is needed because it is possible for more than one CP to simultaneously accept the same queue, but only one CP is permitted to handle any queue at any one time in order to avoid CP conflict in I/O interrupt handling. Therefore, circuitry in SC22 receives the accept, QID and wait (it any) signals from the CPs and always selects only one CP per QID at any one time. If only one CP responds, it is selected by the SC. If plural CPs respond simultaneously with different QIDs, they are all selected for their different QIDs.

If plural CPs respond simultaneously with the same QID, only one CP is selected with the following priorities: If one CP signals it is in wait state, the SC selects the CP in wait state. If both CPs are in wait state, the lowest-numbered CP is selected by the SC. If no CP is in wait state, the SC selects the lowest-numbered of the plural responding CPs.

The SC sends the select signal to the CP on the machine cycle following the first accept cycle. During the selected cycle, the SC inhibits the broadcast of the PND bit for the selected queue to all CPs except the selected CP, so that the selected queue cannot thereafter be selected by any other CP while it is being operated on by the selected CP. Thus, the broadcast PND states PND(0)-PND(7) may be different from the current set states of the bits in PND register 46.

Although the broadcast of a selected PND bit is inhibited to each other CP, none of the non-selected PND bits is inhibited; and each non-selected PND bit continues to be broadcast and therefore remains available for acceptance by another processor. Thus, acceptance and/or selection can be made by one processor while another processor is handling another queue. Plural processors can concurrently be operating on different queues.

When a selected CP has completed its operation on its selected queue, the CP stops sending its accept signal in bus 12A or 12B to the SC. The select signal to a CP remains active from the time the CP is selected by the SC until the SC senses that the accept signal has dropped indicating that the CP is done with the selected queue.

During the last machine cycle of the CP accept signal, the CP signals the SC on its reset line in bus 12A or 12B if the processor found that no active entry remains in that queue.

If the accept signal drops without any signal being received on the reset line, the SC is informed that the queue is not empty, and then the SC removes the inhibit on the PND bit for that queue, and this PND bit is again included in the broadcast on bus 11 to all CPs, so that any CP can thereafter accept that queue in order to contend for handling its next entry.

However, if a CP sends a signal on its reset line during the last accept signal, the SC knows that the queue is now empty, and the SC resets the corresponding queue bit in PND register 46 while removing the inhibit on that bit to PND bus 11. Thus, that PND bit will no longer be broadcast because it is in reset state in register 46 due to its queue now being empty. But as soon as CC24 again provides a SIGI command for that queue, its PND bit is again set and broadcast to all CPs.

DESCRIPTION OF THE DETAILED EMBODIMENT

Figure 2A:
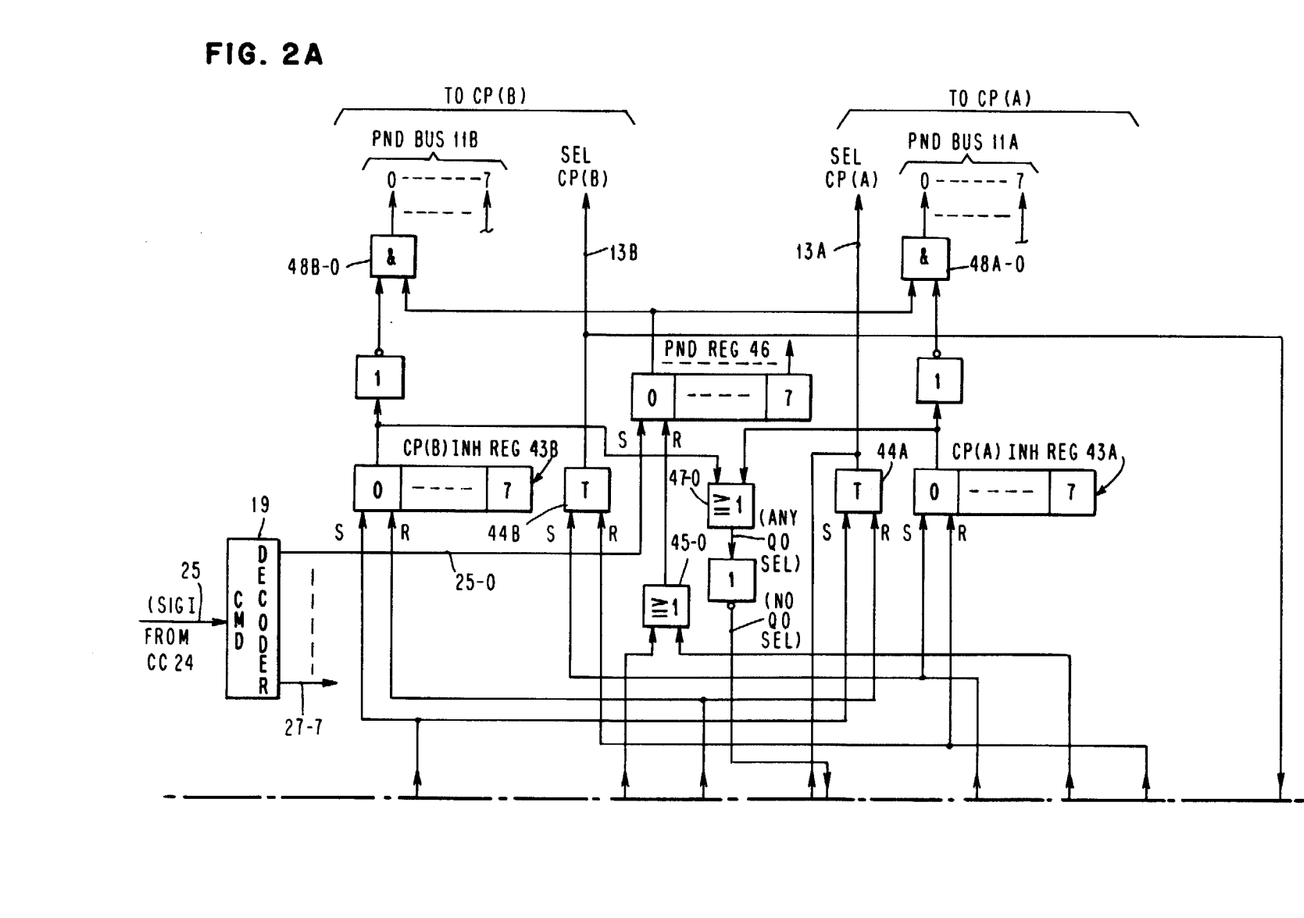
FIGS. 2A and 2B illustrate an embodiment of a channel interrupt controller located within the SC.
Figure 2B:
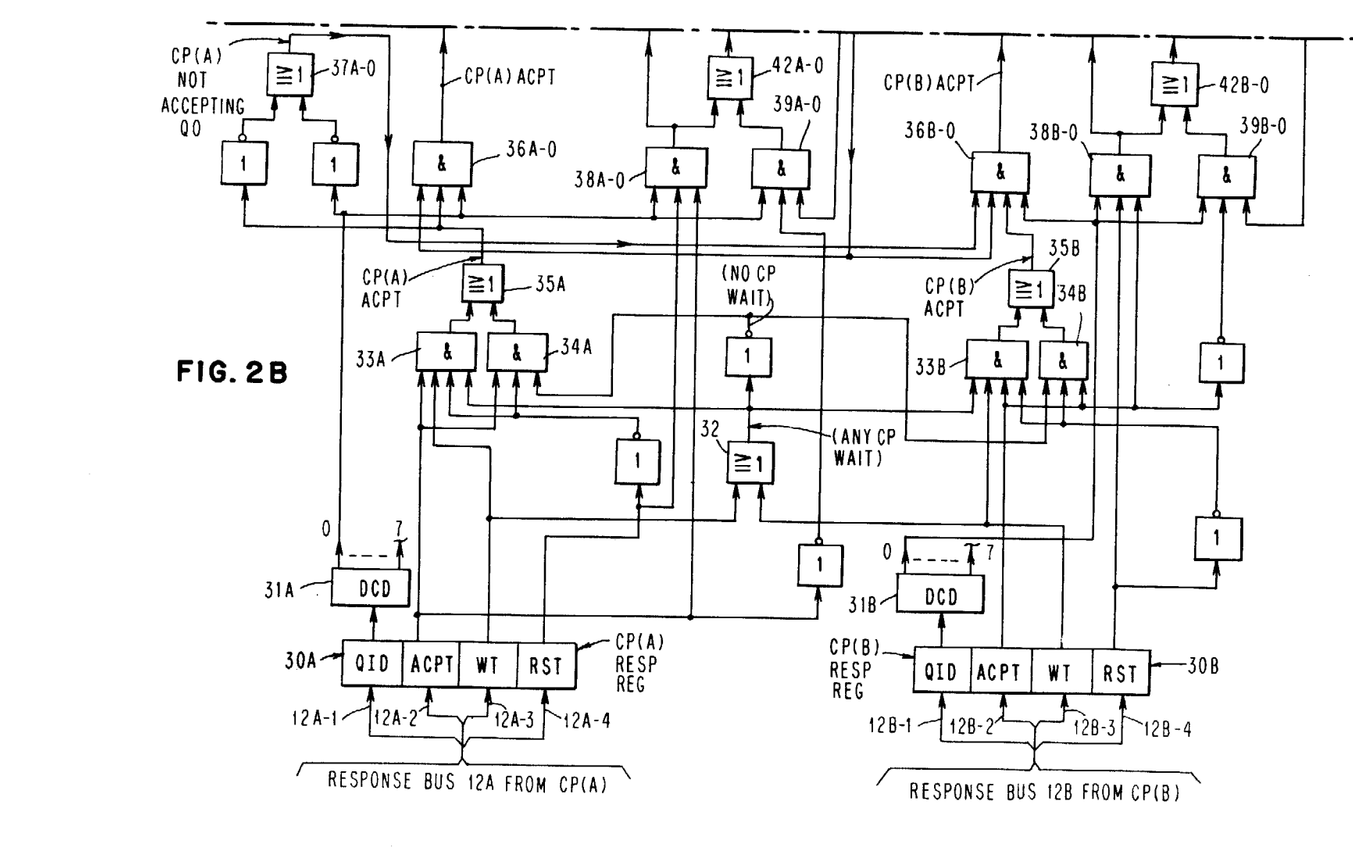

FIGS. 2A and 2B illustrate an embodiment of I/O interrupt handling circuits in system controller (SC) 22. Bus 25 provides each signal interrupt (SIGI) command from the channel controller 24 to a command decoder 19 which provides eight output lines 25-0 through 25-7 that connect to the set inputs for the respective bits in PND register 46. Decoder 19 decodes a queue identifier signal sent by the channel controller identifying the queue onto which an entry is to be chained to represent an I/O type of pending interrupt. Thus, one of the output lines 25-0 through 25-7 will be activated by decoder 19 in response to each SIGI command. Shown in detail in FIG. 2A is an exemplary output line 25-0 which connects to the set input of bit position 0 in interrupt pending (PND) register 46. Not shown to avoid cluttering the drawing is the identical connection of the other seven outputs 25-1 through 25-7 from decoder 19 to the set inputs of the corresponding bit positions 1-7 in PND register 46.

The eight output lines from the eight bit positions in PND register 46 are connected through two sets of AND gates 48A-0 through 48A-7, and 48B-0 through 48B-7, respectively to PND busses 11A and 11B to broadcast the states of the PND bit positions to both CP(A) 20 and CP(B) 21. The two sets of AND gates 48A and 48B are respectively controlled by bit settings in inhibit registers 43A and 43B.

Figure 3A:
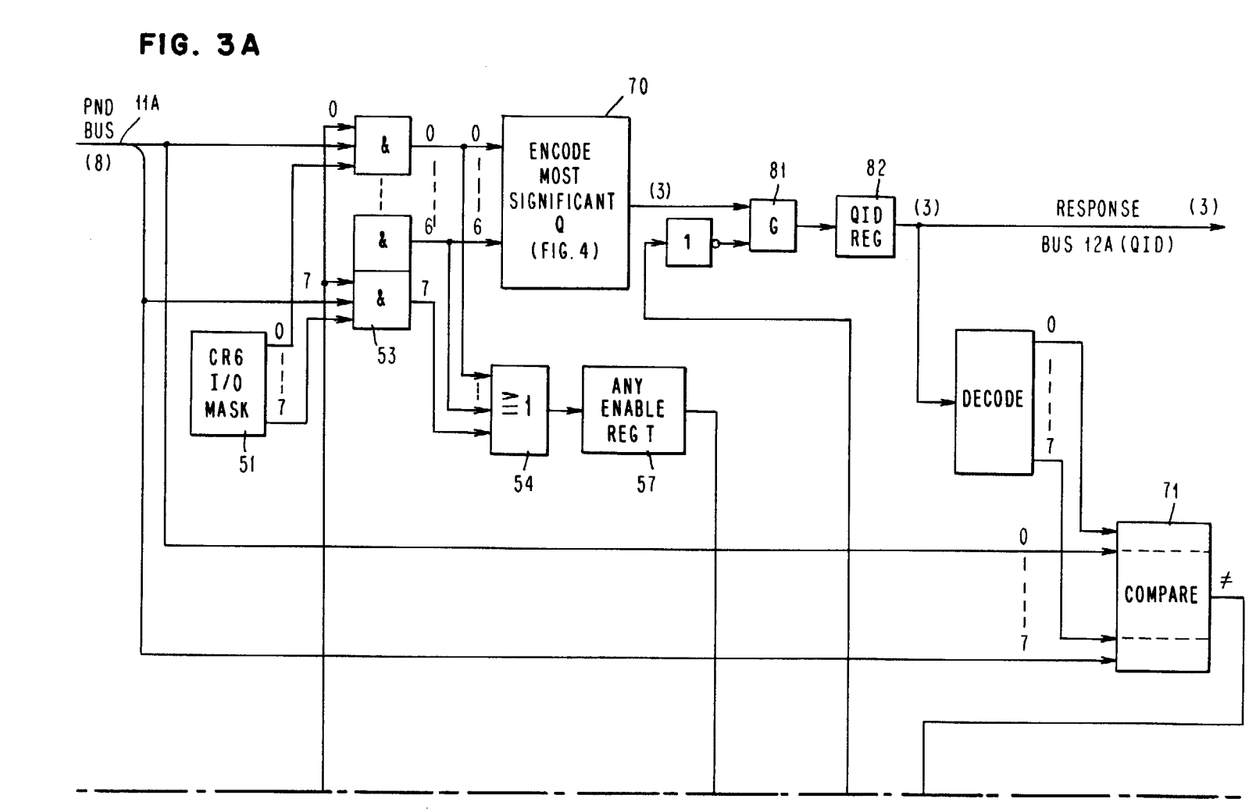
FIGS. 3A and 3B illustrate an embodiment of channel interrupt acceptance circuits found in each CP which operates with the channel interrupt controller in the SC.
Figure 3B:
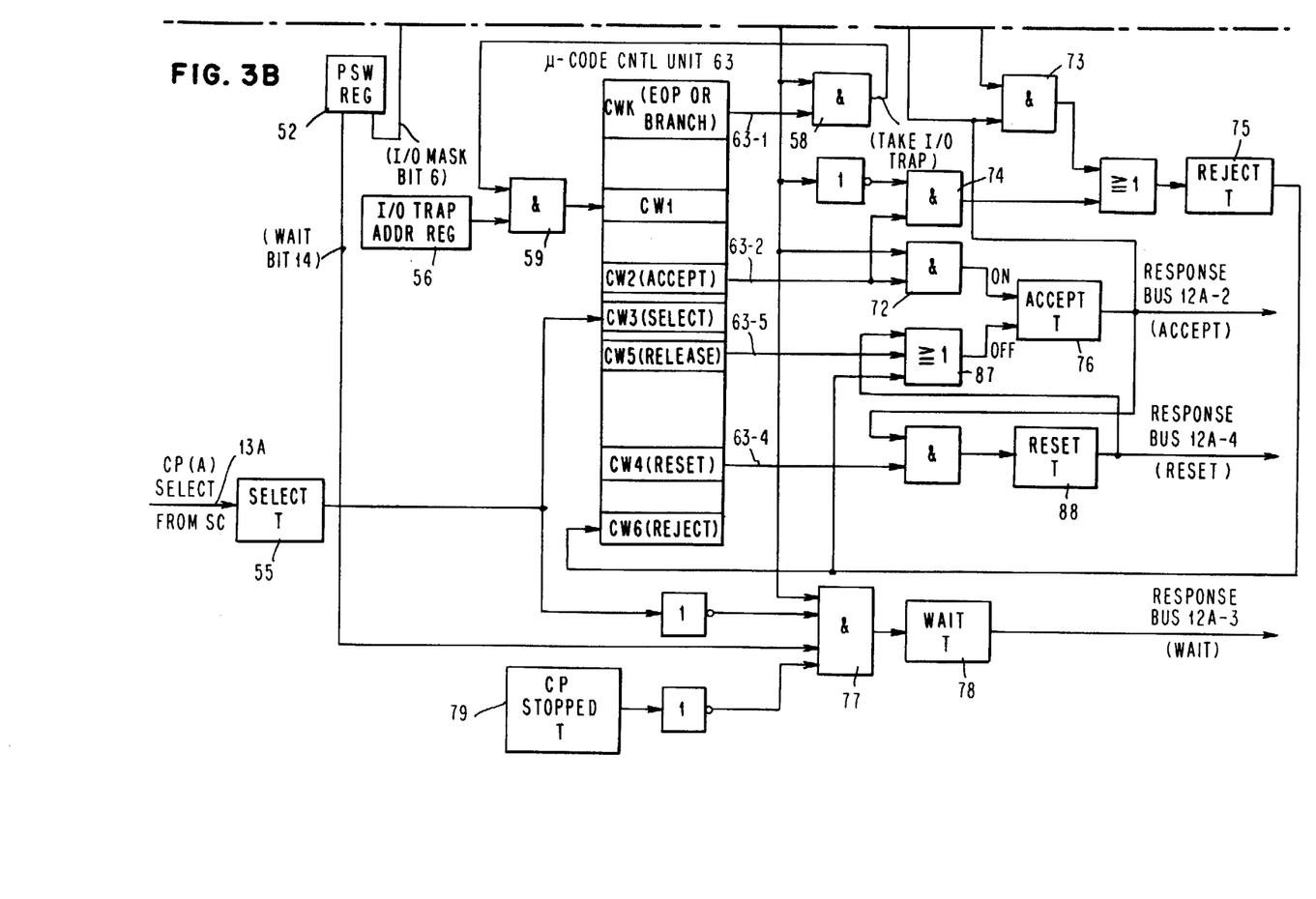

FIGS. 3A and 3B illustrate an embodiment of I/O interrupt acceptance determination circuits in CP(A), which receive broadcast signals from PND bus 11A and provide signals to response bus 12A. Not shown to avoid duplication are the CP(B) circuits identical to those shown in FIGS. 3A and 3B for CP(A) exept that the CP(B) circuits connect to PND bus 11B, response bus 12B and select line 13B.

Thus, in FIG. 3A, the eight (8) lines of PND bus 11A connect to eight AND gates 53 which also respectively receive eight I/O mask bit states outputted from a control register CR6 (having reference number 51) and the I/O mask bit from bit 6 in PSW register 52. I/O interrupt masks in a control register are found in prior commercial IBM System/370 systems. The I/O mask controls whether interrupt queue signals on each of the eight lines in PND bus 11A can be passed on to the acceptance-determining circuits in FIGS. 3A. PSWs are well known in the art and for example, are used in all commercial IBM System/370 central processing units. Only those PND bus lines which are masked on can transfer respective interrupt signals to an OR circuit 54 and to encoding circuits 70.

OR circuit 54 provides an any unmasked PND Q output, which indicates whether any queue is non-empty and unmasked.

Figure 4:
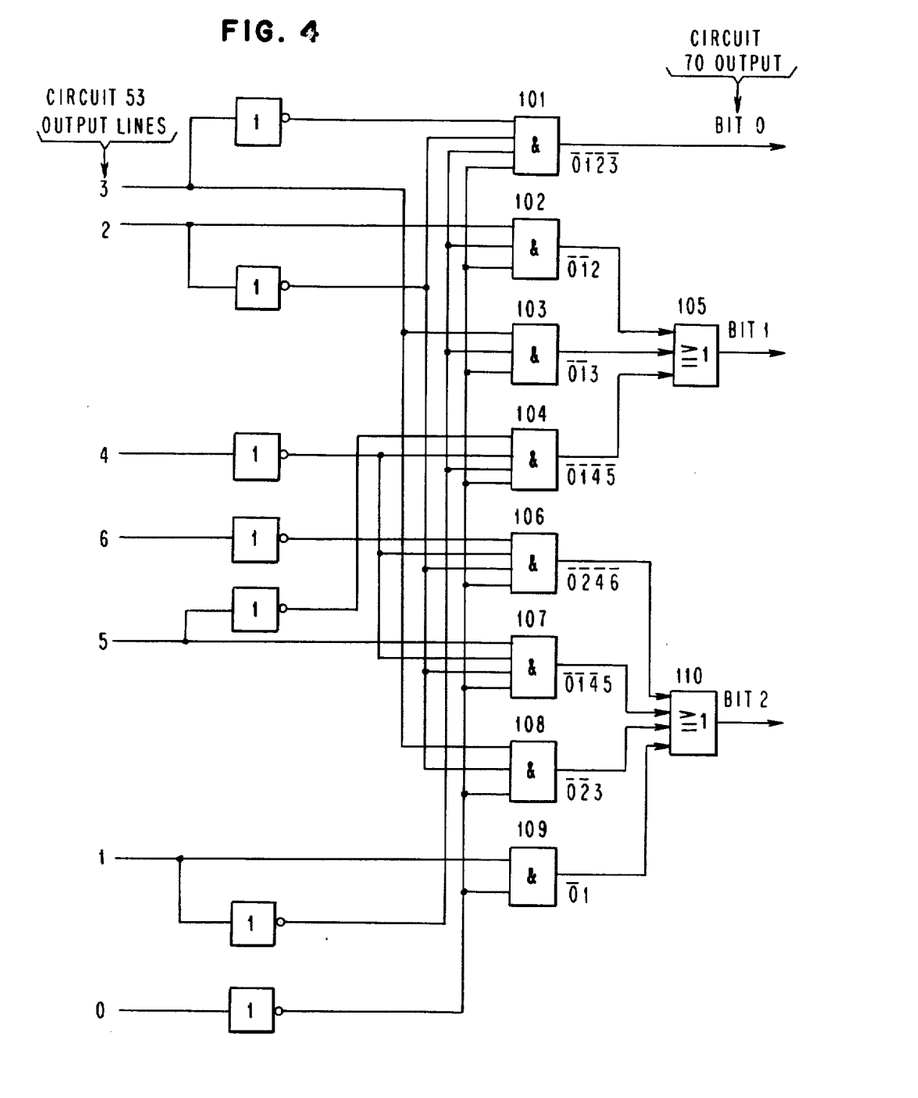
FIG. 4 illustrates a detailed form for an encode most significant queue circuit found in FIG. 3A.

The inputs to circuits 70 are outputs 0-6 of the eight enabled PND output lines from AND gates 53, selects the lowest-number enabled PND output line having a one state (representing the highest-priority active queue which is enabled), and encodes the number of the selected PND output line into a three bit code, which is the outputted QID of circuits 70. FIG. 4 shows the details in circuits 70 and is described later herein.

Gate 81 passes the outputted QID to a queue identifier register 82 which outputs the QID to SC22 on three (3) lines 12A-1, which are part of the CP response bus 12A. Hence, QID register 82 is set to the value of the lowest-number enabled PND output line having a one state. The QID register will continue to be set to this value until accept trigger 76 becomes active.

An any enabled request trigger 57 is set during each machine cycle that an output is provided from OR gate 54. Hence, trigger 57 remains set as long as OR gate 54 provides an active output, which remains as long as any unmasked I/O interrupt request is provided to CP(A). Thus, as soon as CP(A) completes handling one I/O interrupt, it may accept another if the request trigger 57 is then set.

The set output of trigger 57 is provided to an AND gate 58 which also is conditioned by an interruptable state output line 63-1 from a microcode control unit 63, which indicates when CP(A) is in an interruptable state. Normally, the CP is in an interruptable state when its microcode control unit 63 reaches and interprets a control word CWk, which occurs when the CP has reached the end of execution of an instruction, is at an interruptable point in a long-execution instruction, or is in wait state and not stopped.

The take I/O trap output signal from gate 58 indicates that an acceptance-determination operation shall proceed in CP(A) for at least one I/O interrupt request. The take I/O trap signal from gate 58 enables an AND gate 59 to pass a microcode control store address from I/O trap address register 56 to unit 63 which accesses control word (CW)1 at the beginning of a microprogram used in the process for making an acceptance determination.

A possibility exists that CP(A) will not be selected by SC22 when CP(A) is about to accept an I/O interrupt request. A compare circuit 71 detects the non-selection of CP(A) when its output changes to an unequal condition before any select signal is received. Compare circuit 71 receives the decoded QID output of register 82 and also receives the eight PND bus lines. The decoded QID will be equal to one active PND signal unless SC22 selects another CP to handle this queue and thereby inhibits the signal for this queue in the broadcasting PND but 11A, in which case an unequal condition will be provided by compare circuit 71.

Therefore, as long as SC22 has not selected any CP to handle the QID in register 82, compare circuit 71 will output an equal condition. CW2 in unit 63 has its execution initiated by completion of execution of CW1. CW2 activates line 63-2 to condition AND gate 72 to output a signal that sets an accept trigger 76. When accept trigger 76 is set, it outputs an accept signal to SC22 on bus line 12A-2 of the CP response bus 12A.

When CW2 activates line 63-2, one and only one of two actions take place depending on the current state of the any enabled request trigger 57. If the any enabled request trigger 57 is on, the accept trigger 76 is set. If the any enabled request trigger 57 is off, the reject trigger 75 is set via AND circuit N2.

When the accept trigger 76 is on, gate 81 blocks further updating of the QID register 82 and the response bus 12A contains the value of the current highest priority enabled channel interrupt level along with the accept signal 12A-2.

Compare circuit 71 monitors the PND bus 11A for the QID number in QID register 82 and AND circuit N3 will set reject trigger 75 if the interrupt level held in the QID register 82 is no longer on the PND bus 11A. Reject trigger 75 transfers microcode control to CW6 indicating that the accept request issued by CW2 has been rejected. Reject trigger 75 resets accept trigger 76 through OR circuit 87 which in turn allows the QID register 82 to be set to the now current highest priority enabled interrupt.

Response bus line 12A-3 indicates that a CP is in wait state and able to proceed with processing a pending interrupt. AND circuit 77 is conditioned by wait bit 14 to PSW register 52, any enabled interrupt trigger 57, not stopped trigger N, and not already selected by select trigger 55. SC22 uses the response bus line 12A-3 for determining selection when simultaneous accept lines 12A-3 and 12B-3 are received.

The CP selection determination by SC22 is made from the signals it receives on lines 12A-1, 12A-2 and 12A-3 response busses 12A and 12B. Thus, if CP(B) is selected by SC22 to handle a queue which CP(A) is in the process of accepting, or has accepted, then CP(A) will sense its non-selection due to the SC inhibiting of that PND bit on PND bus 11A at the time that SC22 selects CP(B). That is, this sensing is done by circuit 71 outputting an unequal signal, due to PND bus 11A dropping the accepted QID held in QID register 82.

If CP(A) is selected, SC22 activates its CP(A) select line 13A, setting select trigger 55 and forces microcode control unit 63 to execute CW3, which causes CP(A) to access the oldest entry on the selected queue in main storage, to decrement by one a number of entry fields of the queue, to store the interrupt code in the CP(A) processor save area (PSA) in main storage 23, and to initiate execution of CW4 if it is the last queue entry or CW5 if the queue is not empty.

CW4 activates output line 63-4 to provide an empty queue signal and sets a reset latch 88 to provide a reset signal on response bus 12A-4 to the SC. The reset in turn turns off accept trigger 76 through OR circuit 87. CW5 causes unit 63 to activate output line 63-5 which provides a signal through OR circuit 87 that resets accept trigger 76, which drops the accept signal on line 12A-2 to the SC. Then, CW4 or CW5 controls the PSW swapping in CP(A) in the conventional manner which is the interruption operation that initiates the I/O interrupt handling program that handles the pending I/O interrupt represented by the queue entry removed by CW3.

The acceptance signals are provided from FIGS. 3A and 3B to a CP(A) response register 30A in FIG. 2B, which is connected to the bus lines 12A-1, 12A-2, 12A-3, and 12A-4. The identical register 30B in FIG. 2B connects to identical lines (not shown) from CP(B).

In FIGS. 2A and 2B between CP(A) response register 30A and select line 13A is a set of priority circuitry labeled with the letter A and associated with CP(A). Similar circuitry is labeled with the letter B and associated with CP(B) between CP(B) response register 30B and select line 13B. Coordinating priority circuits between the circuits labeled A and B is not labeled with either A or B. The priority circuits associated with CP(A) are described in detail but it is understood that identical circuits are associated with CP(B).

A decoder 31A is connected to the QID output of register 30A to decode the received QID signal into one of eight signals 0–7 at the output of decoder 31A.

An OR circuit 32 receives the wait state outputs from both CPs are in wait state, and this output conditions AND gates 36A-0 through 36A-7 (not shown) as well as AND gates 36B-0 through 36B-7 (not shown) to give priority to selection of any CP in wait state over an interruptable CP not in wait state.

An inverted output of OR circuit 32 indicates a no CP in wait state signal, which conditions AND gates 37A-0 through 37A-7 (not shown) and 37B-0 through 37B-7 (not shown) to control the priority selection among the CPs when no CP is in a wait state. In this case CP(A) is given priority over CP(B).

The pair of AND gates 33A and 34A together with OR gate 35A develop the accept signal for CP(A). Priority is given to the wait state, if CP(B) is in wait state, then no accept signal can be generated for CP(A) without its wait (WT) bit on in register 30A. Common inputs to AND circuits 33A and 34A are the accept (ACPT) bit and inverted reset (RST) bit from register 30A. AND circuit 33A examines the wait bit from 30A if the "any CP wait" signal from OR circuit 32 is active, while AND gate 34A develops the accept signal if no CP is waiting.

The output of the CP(A) accept logic from OR circuit 35A is used in two places. First, it becomes an input to AND gate 36A-0 to develop the "CP(A) accept Q0" signal, together with the Q0 decoded output from circuit 31A and the "no QID select" signal inverted from OR circuit 47-0. Second, it is used to inhibit CP(B) accepting the same Q0 interrupt. This is done through OR 37A-0, which allows a "CP(B) accept Q0" signal from gate 36B-0 only if the CP(A) accept signal is not on or CP(A)'s QID is not decoded as 0 from decoder 31A.

Each set of AND gates 36A-0 through 36A-7 (not shown) for CP(A) and each queue 0–7 sets a trigger 44A that activates select line 13A to select CP(A) to handle the accepted one of queues 0–7. Similarly, the set of AND gates 36B-0 through 36B-7 sets a trigger 44B that activates select line 13B to select CP(B) to handle its accepted one of queues 0–7.

At the same time that any of the AND circuits 36A-0 through 36A-7 or any of the AND gates 36B-0 through 36B-7 turns on a select trigger, it also sets a corresponding bit position within the inhibit register 43A or 43B for the non-selected CP. For example in FIG. 2A, the output of AND circuit 36A-0 is connected to the set input of position 0 in the CP(B) inhibit register 43B as well as to trigger 44A to activate select line 13A to CP(A). The inverted output of bit position 0 of register 43B deconditions AND gate 48B-0 which inhibits line 0 in the PND bus 11B to CP(B). Identical circuitry not shown exists for each of the other positions in each inhibit register 43A and 43B to control all eight lines in each PND bus 11A and 11B.

A circuit 47-0 in FIG. 2A OR's together the position 0 outputs of inhibit registers 43A and 43B. The inverted output "no Q0 select" of 47-0 is used to inhibit the accept AND gates 36A-0 and 36B-0. Thus, if queue 0 is selected by any CP, both gates 36A-0 and 36B-0 for the selection of queue 0 are deconditioned, thereby preventing any other CP selection of queue 0 until a reset signal is received ending the current selection of queue 0. Likewise, not shown are the other OR circuits 47-1 through 47-7 connected to the other corresponding outputs of inhibit registers 43A and 43B for inhibiting the CP selection of the other queues 1–7 while they are being handled by any CP.

Whenever a selected CP is done handling an entry in a queue, the CP deactivates its accept signal on line 12A-2 or 12B-2 to response register 30A or 30B for CP(A) or CP(B), respectively. The deactivation of the accept signal causes a deactivation of the select signal to that CP and a removal of the inhibit on the PND bus line for that queue. This operation is controlled by AND circuits 39A-0 through 39A-7 (not shown) and 39B-0 through 39B-7 (not shown). For example, if queue 0 is being handled by CP(A), AND circuit 39A-0 will become active momentarily when CP(A) drops its accept signal. That is, AND circuit 39A-0 is being conditioned by the output of select trigger 44A and by the QID 0 output of decoder 31A when the accept signal drops in register 30A to activate the inverted accept signal input to circuit 39A-0, which activates the output of circuit 39A-0 that passes through OR circuit 42A-0 to reset select trigger 44A and reset the position 0 in inhibit register 43B.

Whenever a selected CP completes its handling of the last active entry in a queue, the CP generates a reset signal for a machine cycle on its reset line 12A-4 or 12B-4 to response register 30A or 30B according to which CP did the signalling. The reset signal in register 30A or 30B then activates a corresponding AND circuit in group 38A-0 through 38A-7 (not shown) for CP(A) or group 38B-0 through 38B-7 (not shown) for CP(B). For example, if AND gate 38A-0 is activated, it provides an output through OR circuit 45-0 which resets queue position 0 in PND register 46. The output of AND circuit 38A-0 also is provided through circuit 42A-0 to reset the select trigger 44A and reset the position 0 of inhibit register 43B. Lines 0 to 6 from circuit 53 are used for encoding the most significant queue. Code 111 is given for level 7 as well as when there are no enabled pending interrupts. For no enabled interrupts, no action will take place since the any enabled request trigger 57 in FIG. 3A will not be set.

The complement output of all circuit 53 lines are used, but the true output of lines 1, 2, 3 and 5 are the only ones used. The bit 0 output of circuit 70 is provided from AND circuit 101 when it receives any of circuit 53 outputs 4 through 7, or when no circuit 53 output lines are active. The bit 1 output of circuit 70 is provided by an OR circuit 105 which is active when any of AND circuits 102, 103 or circuit 104 is active or if no lines are active. The bit 2 output of circuit 70 is provided by an OR circuit 110 which is active when any of AND circuits 106, 107, 108 or 109 is active or if no lines are active. Note that AND circuits 101–104 and 106–109 are deactivated by any higher level line which does not produce the same ouput bit.

The operation of the circuits in FIGS. 2A, 2B, 3A and 3B is summarized in the following flow charts:

CHART 1
I/O INTERRUPT REQUEST GENERATION

DEVICE CONTROL UNIT: Signals Transmission End Status, or Any Other Interrupt.

↓

CC: Generates I/O INTRPT Request (IR) for subchannel. Puts IR on Queue ($Q_0$–$Q_7$). Q selection is determined by subclass of I/O INTRPT. Issues SIGI CMD to SC per subclass of I/O INTRPT.

↓

SC: Each received SIGI sets a selected Queue bit in PENDING (PND) register. PND bits indicate if pending INTRPT exists in corresponding Q. SC continuously broadcasts all not-yet-selected PND bits to every processor, CP(X).

↓

①(To CHART-2)

CHART 2
CP(X) ACCEPTANCE OF AN I/O INTRPT REQUEST (From CHART-5) ① (From CHART-1)
②─────→↓←─────

(Any =)→ CP(X): Compare PND Bits with CR6 Mask Bits ─(All ≠)→

↓(=)

(=)→ CP(X): Summary Mask ON [PSW Bit 6 = 1] ─(≠)→

↓

CP(X): Set Any Enabled Interrupt Request Trigger 57

↓

(Yes)→ CP(X): u-code End OP Signal Occurs Indicating "Interruptable State" ─(No)→

↓

CP(X): u-code Branch (trap) to Enter u-code I/O INTRPT Sensing Routine

↓

(From CHART-5)
⑦─────→↓

(Any =)→ CP(X): Compare all PND Bits and CR6 Mask Bits ─(All ≠)→
↓
CP(X): Issue END OP for CP(X) to Continue Current Program or Wait State

-continued
CHART 2
CP(X) ACCEPTANCE OF AN I/O INTRPT REQUEST

CP(X): Sense Lowest-numbered Set Bit PND(Q) to Generate QID. Send QID to SC.

↓

CP(X): Set ACCEPT Latch and Signal SC.

↓

CP(X): Set WAIT Latch if CP(X) in WAIT State and signal SC.

↓

③(To CHART-3)

CHART 3
CP SELECTION BY SC

③(From CHART-2)
⑥(From CHART-4) →
↓
(NO) SC: Any CP ACCEPT and QID Signals being received ─(Yes)→
↓
(Yes) SC: Receives one QID from one or more accepting CPs ─(No)→
↓
(Yes) SC: Receives a different QID from each of plural accepting CPs ─(No)→

| SC: Selects priority CP for the received QID. Signals one CP. | SC: Selects each responding CP for its QID. Signals plural CPs. | SC: Selects priority CP for each QID received from plural CPs. Signals selection of one CP for each received QID. |

↓

SC: INHIBITS broadcast of each selected PND(Q) bit to each CP not selected for that QID, but continues signalling of the PND(Q) bit to CP selected for that QID. (PND(Q) bits not inhibited continue to be broadcast to all CPs.)

↓         ↓
(To CHART-4) ④   ⑤ (To CHART-5)

Parallel Operations

CHART 4
SC I/O INTRPT COMPLETION OPERATIONS

-continued
CHART 4
SC I/O INTRPT COMPLETION OPERATIONS

CHART 5
CP(X) I/O INTRPT COMPLETION OPERATIONS

-continued
CHART 5
CP(X) I/O INTRPT COMPLETION OPERATIONS

Although a multiprocessor with two CPs and one SC has been described in the detailed embodiment, it is apparent to those skilled in the computer science arts that the concepts taught herein can easily be extended to a multiprocessor with more than two CPs and more than one SC, wherein the CI controller in each SC resolves contentions among all CPs for each queue.

While the invention has been particularly shown and described with references to a preferred embodiment thereof, it will be understood by those skilled in the art that the foregoing and other changes in form and details may be made therein without departing from the spirit and scope of the invention.

Having thus described our invention, what we claim as new and desire to secure by Letters Patent is:

1. I/O interrupt handling means in a multiprocessor system including a shared main storage (MS), plural central processors (CPs), at least one input/output processor (IOP) capable of communicating plural levels of pending I/O interrupt requests (I/O IRs), each I/O IR requiring execution of an interruption handling program by any one of said plural CPs, and a system I/O interrupt controller in a system controller (SC), the I/O interrupt handling means comprising an I/O interrupt pending register associated with said SC and having a plurality of positions respectively settable by plural levels of I/O IRs from the IOP, said positions each providing an empty/non-empty state signal for a respective queue in MS, each queue containing I/O IRs associated with a given I/O IR level, broadcast means connecting the outputs of the positions of the pending register to each of the CPs, accepting means in each CP connected to the broadcast means for accepting a highest-priority-unmask non-empty state position from the broadcast means as an accepted queue identifier when the CP is in an interruptable state, the accepting means generating and transmitting to the SC an accept signal and an accepted queue identifier signal, selecting means in said SC immediately responsive to all received accept signals and queue identifier signals for selecting one accepting CP and its queue identifier, and the selecting means sending a select signal to each selected CP, and inhibiting means in the SC for inhibiting the broadcast means from transmitting a signal for each pending register position associated with each selected queue identifier to all CPs except the CP selected for the selected queue identifier.

2. I/O interrupt handling means in a multiprocessing system as defined in claim 1, the accepting means for each respective CP further comprising acceptance-termination means in each CP responsive to termination of the broadcast of the position signal representing the accepted queue identifier, whereby the acceptance-termination means senses when an accepting CP has not been selected by the SC so that the CP can proceed with another operation.

3. An I/O interrupt handling means as defined in claim 2, the accepting means for each respective CP further comprising a mask control gate connected to the broadcast means, I/O interrupt existence means for detecting a continuation of the highest-priority-unmasked non-empty state position from the mask control gate, interruptable state means in the respective CP, a queue-identifier register for receiving the associated queue identifier while the I/O interrupt existence means detects the continuation and the interruptable state means detects an interruptable state, and the output of the queue-identifier register being provided as the accepted queue identifier signal to the SC to identify the accepted queue by the respective CP.

4. An I/O interrupt handling means as defined in claim 3, the accepting means for each respective CP further comprising comparing means for comparing the queue identifier at the output of the queue-identifier register with the accepted queue-identifier signal from the mask control gate, an accept latch being set by an equal output from the comparing means after a time lapse, the output of the accept latch being transmitted to the SC as the accept signal for the respective CP.

5. An I/O interrupt handling means as defined in claim 4, the acceptance means in the respective CP further comprising unequal output sensing means for sensing an unequal output from the comparing means after an equal output was provided, and means for resetting the accept latch in response to the unequal output to prohibit or terminate any acceptance signal.

6. An I/O interrupt handling means as defined in claim 5, the accepting means in each respective CP further comprising a wait latch, wait sensing means for sensing the existence of a wait state for the respective CP, means for setting the wait latch when a CP is waiting for an interrupt for which it is enabled to provide a wait state output from the wait latch, and wait-state means for transmitting the output of the wait latch to the SC from the respective CP.

7. An I/O interrupt handling means as defined in claim 6, the respective CP further comprising a reset latch, CP means for removing an entry on a selected queue after the respective CP is selected by the SC, the CP means determining the empty/non-empty state of the selected queue after removal of the entry and setting the reset latch when an empty state is determined for the selected queue, and connection means being provided from the output of the reset latch from the respective CP to the SC.

8. An I/O interrupt handling means as defined in claim 7, the respective CP further comprising an any enabled request latch being set by an output of the I/O interrupt existence means indicating any non-empty-state unmask position signal being broadcast to the respective CP when I/O interrupts are unmasked by a program status word in the respective CP, an I/O interrupt microprogram being initiated by the output of the microcode trap signal to provide the CP means for removing the entry and determining the empty/non-empty state of the selected queue.

9. An I/O interrupt handling means as defined in claim 8, the respective CP further comprising completion means for indicating completion of execution of the I/O interrupt microprogram, and means for resetting the accept latch in response to the completion means indicating completion.

10. An I/O interrupt handling means as defined in claim 9, the SC selecting means further comprising a plurality of CP response registers respectively associated with the plural CPs, each response register receiving from a respective CP any outputted queue identifier signal, the accept signal, the wait signal, and the reset signal.

11. An I/O interrupt handling means as defined in claim 10, the SC selecting means further comprising a plurality of CP select triggers having outputs respectively connected to the respective CPs, CP select priority circuits receiving the outputs of the CP response registers for determining which CP among one or more accepting CPs is to be selected to handle an accepted queue, means for setting the respective CP select trigger in response to selection by the CP select priority circuits of one CP for each accepted queue identifier indicated in the CP response registers.

12. An I/O interrupt handling means as defined in claim 11, the SC selecting means further comprising gate means for giving priority to the accepted queue of any single CP in wait state, the gate means setting the select trigger for that CP.

13. An I/O interrupt handling means as defined in claim 12, the SC selecting means further comprising the gate means including means for giving priority by CP number to one CP among plural CPs in wait state accepting the same queue, the gate means setting the select trigger for each CP given priority for each queue.

14. An I/O interrupt handling means as defined in claim 13, the SC selecting means further comprising the gate means including other means for giving priority by CP number to one CP among plural CPs accepting the same queue when no accepting CP accepting the queue is in wait state, the gate means setting the select trigger for each CP given priority for each queue.

15. An I/O interrupt handling means as defined in claim 14, the SC selecting means further comprising the gate means giving priority concurrently to plural CPs when plural CPs concurrently accept different queues, the gate means setting the select triggers for the selected CPs.

16. An I/O interrupt handling means as defined in claim 15, further comprising
- an I/O channel processor generating I/O interrupt commands, each command indicating an I/O interrupt and the queue to which the interrupt is assigned,
- I/O interrupt command decoder means in the SC for receiving the I/O interrupt request commands from the I/O channel processor and detecting the queue assigned to the interrupt,
- a plurality of outputs of the command decoder means corresponding to the plurality of I/O interrupt queues in main storage, the outputs being respectively connected to the set inputs of corresponding queue positions of the pending register,
- whereby each command for an I/O interrupt sets a position in the pending register corresponding to the queue in main storage on which an entry is made for the I/O interrupt under control of the I/O channel processor.

17. An I/O interrupt handling means as defined in claim 16, the inhibiting means in the SC further comprising
- a plurality of inhibit registers respectively associated with the plural CPs, each inhibit register having a plurality of positions respectively corresponding to the queue positions in the pending register,
- a plurality of broadcast gate means, each broadcast means having respective gates conditioned by the respective outputs of the pending register and the respective outputs of the inhibit register for an associated CP, and
- means for setting a queue position in the inhibit registers for the other CP's when the associated CP is selected by the CP selecting means for that queue position, and
- means for resetting that queue position in each of the other inhibit registers for the other CPs,
- whereby the broadcast gate means for each CP provides the input to the broadcast means to each respective CP.

18. An I/O interrupt handling means as defined in claim 17, the SC selecting means further comprising
- a wait-state OR circuit having inputs connected respectively to outputs of a wait-signal position in each of the plurality of CP response registers, whereby the output of the wait-state OR circuit indicates if any CP is in the wait state, and
- a no-wait-state inverter circuit connected to the output of the wait-state OR circuit to indicate when no CP is in wait state.

19. An I/O interrupt handling means as defined in claim 18, the SC selecting means further comprising
- a plurality of selected-queue OR circuits, each having inputs connected to respective corresponding outputs of all inhibit registers,
- whereby the outputs of the selected-queue OR circuits respectively indicate if each of the respective queues is currently selected for any CP,
- a plurality of no-selected-queue inverters respectively connected to the outputs of the selected-queue OR circuits,
- whereby the outputs of the no-selected-queue inverters indicate which of the queues is not currently selected by a CP.

20. An I/O interrupt handling means as defined in claim 19, the SC selecting means further comprising
- a plurality of respective decoding means, each connected to a queue identifier position in each respective CP response register, a plurality of outputs of the decoding means being associated with the plurality of queue positions of the pending register, and
- a set of CP acceptance gates respectively associated with each CP, each acceptance gate in each set having an input connected to a respective output of an associated decoding means, another input being connected to an accept signal position in the associated CP response register, and still another input being connected to an inverted output from a reset signal position in the associated CP response register,
- whereby an activated output of one of the CP acceptance gates in the set indicates a decoding of which queue has been accepted by the associated CP.

21. An I/O interrupt handling means as defined in claim 20, the SC selecting means further comprising
- a plurality of queue-identifier decoders, each decoder being connected to the queue-identifier position in each respective CP response register, a plurality of outputs of each decoder corresponding to the respective queue positions in the pending register,
- a group of CP acceptance AND circuits associated with each CP and with each queue position of the pending register, each acceptance AND circuit in one group having one input connected to a different output of an associated queue-identifier decoder, having another input connected to the output of the accept position of the associated CP response register, and having still another input connected to an inverted output of the reset position of the associated CP response register, whereby the outputs of the CP accept AND circuits in each group signal the acceptance of the respective queues by a particular CP, and
- priority inverter means connecting the output of each CP accept AND circuit in one group associated with a higher priority CP to an input of each CP accept AND circuit in another group associated with a lower priority CP,
- whereby the groups of CP accept AND circuits are connected so that only one CP accept AND circuit in any set can be enabled per queue and the enabled AND circuit is associated with the highest-priority CP accepting the particular queue.

22. An I/O interrupt handling means as defined in claim 21, the SC selecting means further comprising
- a plurality of groups of wait-state AND circuits, the groups being respectively associated with the plurality of CPs, the AND circuits in each group being associated with the queue positions of the pending register, each AND circuit in each group having a first input connected to the output of a corresponding no-selected-queue inverter associated with the same queue, having a second input connected to the output of a corresponding CP accept AND circuit, having a third input connected to the output of the wait-state position of the associated CP response register, and having a fourth input connected to the output of the wait-state OR circuit, and
- first OR connecting means for connecting the outputs of the wait-state AND circuits in each group to the set input of the select trigger for the associated CP, and for connecting the outputs of the wait-state AND circuits to the set inputs of the respective positions in each inhibit register associated with each other CP, whereby the wait-state AND circuits select among contending CPs in wait-state.

23. An I/O interrupt handling means as defined in claim 22, the SC selecting means further comprising a plurality of groups of non-wait-state AND circuits, the groups being respectively associated with the plurality of CPs, the AND circuits in each group being associated with the queue positions of the pending register, each non-wait-state AND circuit in each group having a first input connected to the output of a corresponding no-selected-queue inverter associated with the same queue, having a second input connected to the output of a corresponding CP accept AND circuit, and having a third input connected to the output of the no-wait-state inverter, and the outputs of the non-wait-state AND circuits being connected to the first OR connecting means, whereby the no-wait-state AND circuits select among contending CPs when no CP is in wait state.

24. An I/O interrupt handling means as defined in claim 23, the SC selecting means further comprising a plurality of groups of deselecting AND circuits, the groups being respectively associated with the plurality of CPs, the AND circuits in each group being associated with the queue positions of the pending register, each group of deselecting AND circuits having a deselecting AND circuit for each queue, each deselecting AND circuit having a first input connected to a respective output of the decoding means associated with the same CP response register, having a second input connected to the inverted output of the accept signal position of the associated CP response register, and having a third input connected to the output of the select trigger for the associated CP, a plurality of second OR connecting means for connecting the outputs of the deselecting AND circuits respectively to the reset inputs of the different queue positions in each inhibit register associated with each other CP, and to the reset input of the select trigger for the associated CP, whereby each deselecting AND circuit terminates the selection of the CP that terminates its accept signal, and removes the inhibiting of the broadcast for the corresponding queue so that another selection of the queue may be done by any CP.

25. An I/O interrupt handling means as defined in claim 23, the SC selecting means further comprising a plurality of sets of deselecting AND circuits, each set being associated with the queue positions of the pending register, each set having one of the deselecting AND circuits for a respective queue, each set also having one of a plurality of empty-state AND circuits, each empty-state AND circuit in each set having a first input connected to a respective output of the decoding means associated with the same CP response register, having a second input connected to the output of the reset position of the associated CP response register, and having a third input connected to the output of the accept position of the associated CP response register, the output of each empty-state AND circuit being respectively connected to an input of one of the plurality of second OR connecting means for the same set, and a plurality of third OR connecting means, each third OR connecting means connecting the outputs of the empty-state AND circuits for the same queue to the respective reset input of the associated queue position in the pending register, whereby the empty-state AND circuits remove the selection of any CP when any CP issues a reset signal with its accept signal, remove inhibits for the associated queues on the broadcasting means, and reset corresponding queue positions in the pending register when any CP has emptied any corresponding queue by removing an entry.

26. An I/O interrupt handling means as defined in claim 12, the SC selecting means further comprising gate means for giving priority to the accepted queue of each of plural CPs in wait state when the plural CPs each accept a different queue.

* * * * *